United States Patent [19]

Hattori et al.

[11] Patent Number: 5,109,401
[45] Date of Patent: Apr. 28, 1992

[54] RADIO TELECOMMUNICATION APPARATUS CAPABLE OF CONTROLLING CALL CHARGES

[75] Inventors: Kiyoshi Hattori; Shinya Takahashi, both of Hino, Japan

[73] Assignee: Kabushiki Kaisha Toshiba, Kawasaki, Japan

[21] Appl. No.: 549,397

[22] Filed: Jul. 6, 1990

[30] Foreign Application Priority Data

Jul. 7, 1989 [JP] Japan .................. 1-176067

[51] Int. Cl.$^5$ .......................... H04M 11/00
[52] U.S. Cl. ........................ 379/58; 379/60; 379/62; 379/90; 379/91
[58] Field of Search ............... 235/380, 381; 379/58, 379/59, 60, 61, 62, 63, 91, 113, 130, 131, 140, 144, 56, 90, 111, 112, 114, 143

[56] References Cited

U.S. PATENT DOCUMENTS

| | | | |
|---|---|---|---|
| 4,122,308 | 10/1978 | Weinberger et al. | 379/131 |
| 4,640,986 | 2/1987 | Yotsutani et al. | 379/60 |
| 4,677,653 | 6/1987 | Weiner et al. | 379/58 |
| 4,751,728 | 6/1988 | Treat | 379/113 |
| 4,776,000 | 10/1988 | Parienti | 379/62 |
| 4,777,646 | 10/1988 | Harris | 379/91 |

FOREIGN PATENT DOCUMENTS 0115924  8/1984  European Pat. Off. ............ 379/130
2046556  11/1980  United Kingdom ................. 379/144

OTHER PUBLICATIONS

IBM Technical Disclosure Bulletin, vol. 30, #3, Aug. 1987, "Personal Transaction Card", p. 1262.
Matsuo, Shimohara, Matsui, Tokunaga, "Personal Telephone Services Using IC-Cards", IEEE C.M.

Primary Examiner—James L. Dwyer
Assistant Examiner—William Cumming
Attorney, Agent, or Firm—Finnegan, Henderson, Farabow, Garrett and Dunner

[57] ABSTRACT

A radio telecommunication apparatus in which a telecommunication link is made between the user of the apparatus and a second party, a charge rate is obtained from a base station coupled to the apparatus, a first allowable call charge for one call is set, speech communication time in each call is counted to provide a count value, a current call charge is calculated based on the charge rate, the current call charge is compared with the first allowable call charge to determine whether the current call charge exceeds the first allowable call charge, and both the user of the apparatus and the second party are informed when the current call charge exceeds the first allowable call charge.

14 Claims, 6 Drawing Sheets

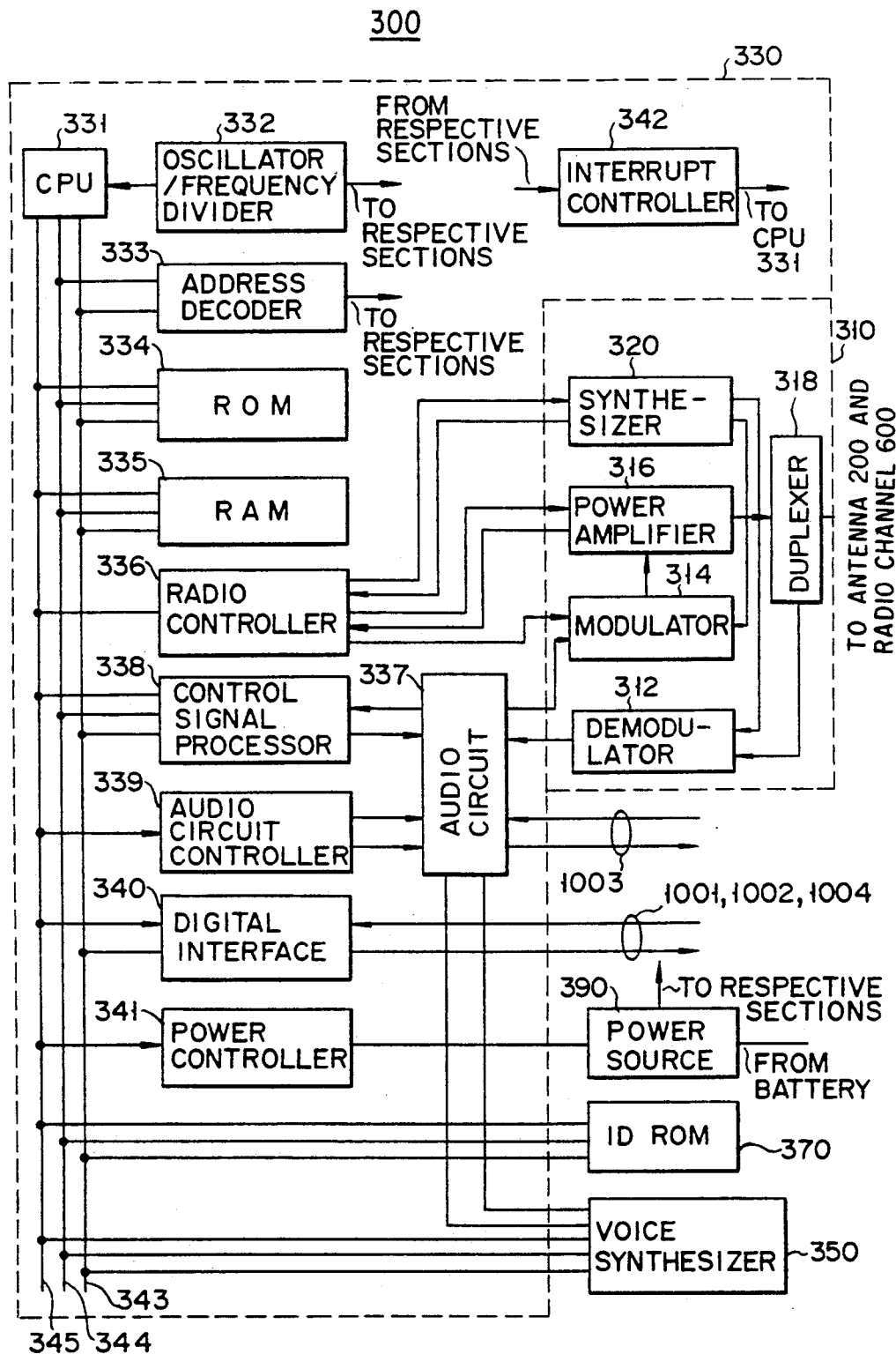
F I G. 2

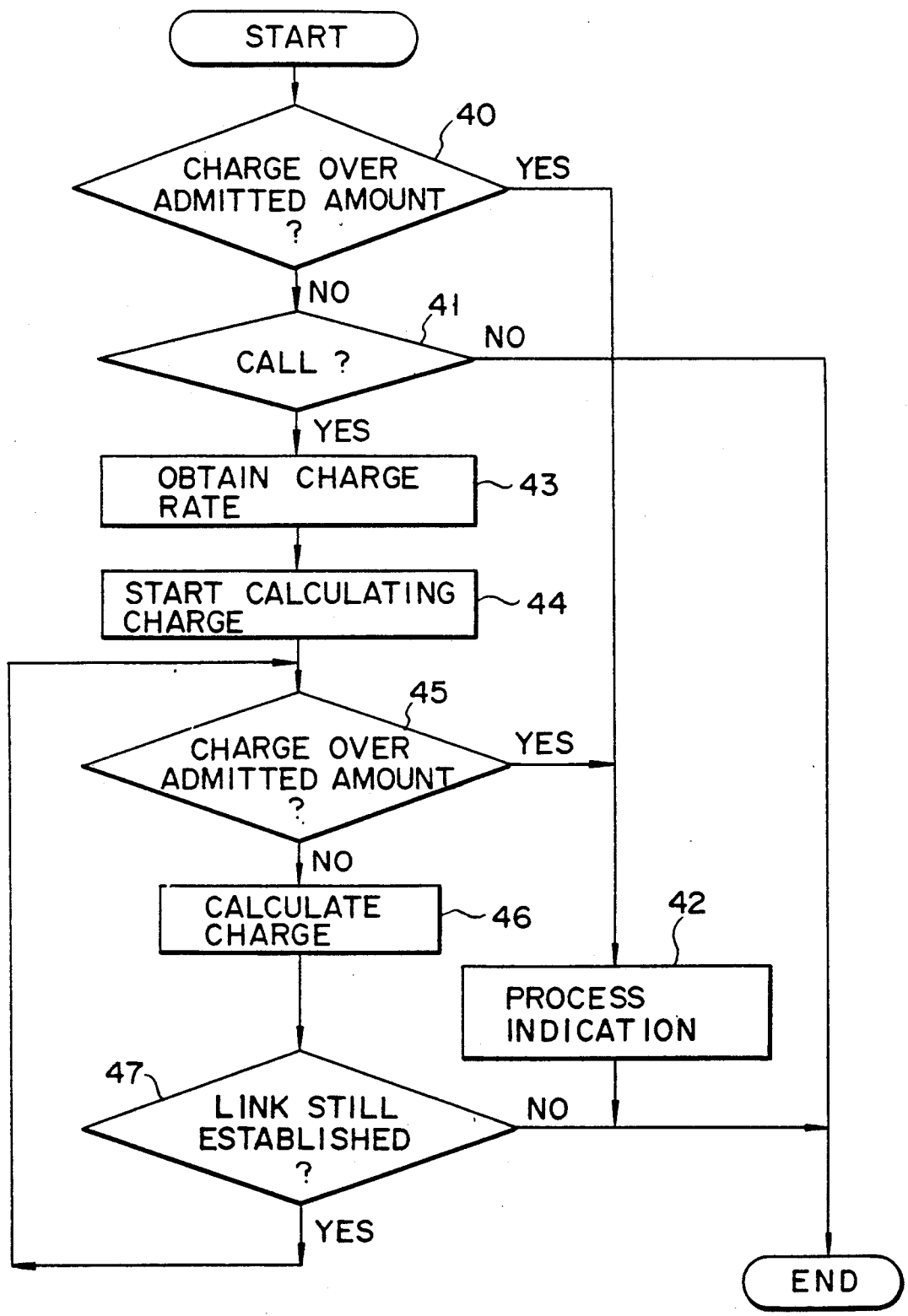
F I G. 5

RADIO TELECOMMUNICATION APPARATUS CAPABLE OF CONTROLLING CALL CHARGES

BACKGROUND OF THE INVENTION

1. Field of the Invention

The present invention relates to a radio telecommunication apparatus mounted on a mobile body such as an automobile.

2. Description of the Related Art

An automobile radio communication apparatus is available as one means for constituting a communication network including a mobile body.

Recently, such a radio communication apparatus has been rapidly spread and has become popular. However, the charge rate of this apparatus is considerably higher than that of a normal wire telephone. For this reason, a demand has arisen for means for managing the call charge of a radio telephone during speech communication and preventing wasteful, long speech communication.

SUMMARY OF THE INVENTION

It is an object of the present invention to provide a radio telecommunication apparatus which can inform a user that a call charge for one call exceeds a preset call charge.

It is another object of the present invention to provide a radio telecommunication apparatus which can stop speech communication when a call charge for one call exceeds a preset call charge.

It is still another object of the present invention to provide a radio telecommunication apparatus which can inform a user that accumulated call charges exceed a preset call charge.

It is still another object of the present invention to provide a radio telecommunication apparatus which can stop speech communication when accumulated call charges exceed a preset call charge.

In order to achieve the above objects, a radio telecommunication apparatus according to the present invention comprises:

first storage means for obtaining a charge rate from system data received from a base station, and storing the charge rate;

first setting means for setting a first allowable call charge for one call;

second storage means for storing the first allowable call charge;

count means for counting a speech communication time in one call, and obtaining a count value;

call charge calculating means for calculating a current call charge from the charge rate stored in the first storage means and the count value;

first detecting means for comparing the current call charge calculated by the call charge calculating means with the first allowable call charge, and detecting that the current call charge exceeds the first allowable call charge; and first informing means for informing a user that the current call charge exceeds the first allowable ca 1 charge in response to the detection result received from the first detecting means According to the radio telecommunication apparatus of the present invention, when speech communication is started, a call charge is calculated by the call charge calculating means on the basis of a speech communication time and a charge rate. The detecting means then starts to compare the current call charge with a preset allowable call charge. When it is detected that the current call exceeds the allowable call charge, the informing means communicates this state to the user.

According to the present invention, therefore, since long speech communication is determined on the basis of a call charge, and this state can be informed to the user, an excellent economical effect can be expected.

In addition, according to the present invention, the radio telecommunication apparatus further comprises:

second setting means for setting a second allowable call charge for a plurality of calls;

third storage means for storing the second allowable call charge.

fourth storage means for sequentially storing an accumulated call charge calculated by the call charge calculating mean for the plurality of calls;

second detecting means for comparing the accumulated call charge stored in the fourth storage means with the second allowable call charge, and detecting that the accumulated call charge exceeds the second allowable call charge; and second informing means for informing a user that the accumulated call charge exceeds the second allowable call charge in response to the detection result received from the second detecting means.

With this arrangement, when an accumulated call charge for a plurality of calls exceeds the second allowable call charge, this state is communicated to the user. Therefore, management of call charges is facilitated.

According to the above-described radio telecommunication apparatus, when a call charge exceeds a preset allowable call charge, the user is informed of this state. However, when a call charge exceeds a preset call charge, the speech communication may be stopped.

In addition, in the above-described radio telecommunication apparatus, a charge rate is obtained from system data from the base station. However, the user may set a charge rate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the radio unit in the radio telecommunication apparatus in FIG. 1;

FIG. 5 is a flow chart showing an operation sequence of a radio telecommunication apparatus according to the third embodiment of the present invention.

DETAILED DESCRIPTION OF THE PREFERRED EMBODIMENTS

A preferred embodiment of the present invention applied in a mobile telephone will be described with reference to the accompanying drawings.

Figure 1:
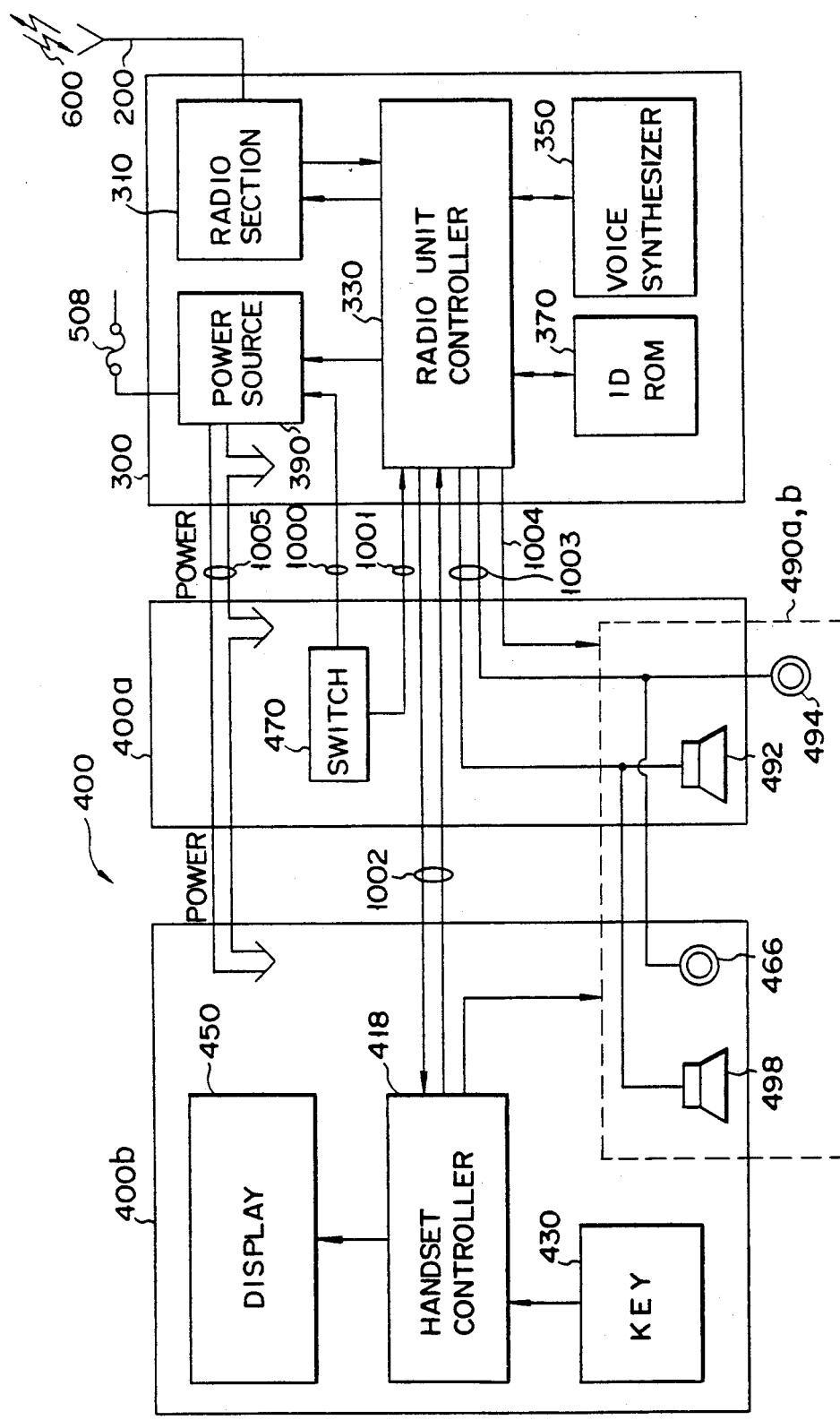
FIG. 1 is a block diagram for explaining an arrangement of an overall radio telecommunication apparatus according to the present invention.

FIG. 1 is a block diagram showing an arrangement of a mobile telephone apparatus according to an embodiment of the present invention. Referring to FIG. 1, mobile telephone apparatus 100 comprises antenna 200, radio unit 300 and telephone unit 400. Antenna 200 is mounted on an outer body surface of an automobile. Telephone unit 400 is mounted near the driver's seat inside the automobile.

Radio unit 300 includes radio section 310 for establishing radio channels 600 with a base station (not shown) through antenna 200 and for exchanging signals therewith, radio unit controller 330 for controlling the overall operations of the apparatus, voice synthesis circuit 350 for synthesizing voices, ID ROM 370 for storing ID numbers with the corresponding system identification numbers and power source 390 for supplying power from the battery mounted in the automobile to the above components through fuse 508.

Telephone unit 400 includes handset controller 418 for controlling the overall operations of telephone unit 400 in response to instructions or the like from radio unit controller 330, key unit 430 for entering key inputs, display unit 450 for displaying numerical or alphabetical characters in response to control signals from handset controller 418, switches 470 including a hook switch and a power switch, and selectable audio input/output units 490a and 490b for inputting or outputting an audible sound. Telephone unit 400 may be divided into main unit 400a and handset 400b. Microphone 494 may be a hands-free microphone 494 mounted on a sun visor or the like near the driver's seat and is connected to main unit 400a. Loudspeaker 492 may be mounted in main unit 400a. Handset controller 418, key unit 430, and display unit 450 are mounted in handset 400b. Handset microphone 466 and handset receiver 498 constitute audio input/output unit 490b of handset 400b.

Each section of radio unit 300, main unit 400a and handset 400b are supplied with power by way of a power line 1005 extending from power source 390 in radio unit 300. The opened or closed status of switches 470 is transmitted to power source 390 or radio unit controller 330 by way of line 1000 or line 1001, respectively. Control and/or command signals are transmitted between handset controller 418 and radio unit controller 330 by way of line 1002. Audio signals are transmitted by way of lines 1003. Radio unit controller 330 sends control signals to audio input/output unit 490a, 490b by way of lines 1004.

FIG. 2 is a block diagram showing a detailed arrangement of the radio unit of FIG. 1. Referring to FIG. 2, radio section 310 comprises demodulator 312, modulator 314, duplexer 318 and synthesizer 320. Demodulator 312 demodulates a radio signal received from the base station through radio channels 600, antenna 200 and duplexer 318. It should be noted that this signal includes audible sound signals and control signals. Modulator 314 modulates the audio and control signals received from audio controller 300 and generates the required transmission signals.

Power amplifier 316 amplifies the transmission signals received from modulator 314. The amplification of power amplifier 316 may be continuous or variable in a step-wise fashion, e.g., 8-step variable. Duplexer 318 sends the signals received through radio channel 600 to demodulator 312 and the signals from modulator 314 and power amplifier 316 to antenna 200. Synthesizer 320 is formed of a channel selection local oscillator an specifies a frequency from which signals are demodulated by demodulator 312 and a frequency to which signals are modulated by modulator 314.

Radio unit controller 330 is formed at central processing unit (CPU) 331, oscillator/frequency divider 332, address decoder 333, ROM 334, RAM 335, radio controller 336, audio circuit 337, control signal processor 338, audio circuit controller 339, digital interface 340, power controller 341 and interrupt controller 342. Reference numerals 343, 344 and 345 denote a data bus, an address bus and a control bus, respectively. CPU 331 controls the operation of radio unit controller 330. Oscillator/frequency divider 332 supplies clock signals to CPU 331 and divides the clock signals to supply appropriate frequency-divided pulses as timing pulses to each section of the mobile telephone apparatus requiring them. Address decoder 333 outputs predetermined operation signals to the components in response to instruction signals from CPU 331. ROM 334 stores various programs required for operation of CPU 331. RAM 335 stores various types of data during processing for use by CPU 331. Radio controller 336 controls radio section 310 in response to instructions from CPU 331. For example, radio controller 336 sends signals indicative of available frequencies to synthesizer 320, signals indicative of an amplification level to power amplifier 316, and signals indicative of modulation parameters to modulator 314. Radio controller 336 receives a step-out signal from synthesizer 320 and output power detection signals from power amplifier 316 and forwards these signals to CPU 331, thereby preventing operational errors.

Audio circuit 337 extracts control signals and audio signals from the received signals demodulated by demodulator 312 and supplies the control signals to control signal processor 338 and the audio signals to telephone unit 400. Audio circuit 337 also supplies a control signal from control signal processor 338 and audio signals from telephone set 400 to modulator 314. It should be noted that audio circuit 337 also arranges the waveform of the control signal to be sent to control signal processor 338 in a particular signal format and filters the control signal to be supplied to modulator 314. Control signal processor 338 acquires bit and frame synchronization with the control signal from audio circuit 337. Maintaining the required synchronization, control signal processor 338 converts the serial control signals, including control data received from a base station, into parallel signals and converts the parallel control data signals to be transmitted to a base station into serial signals. The control signals are set to and from the base station via audio circuit 337.

Audio circuit controller 339 controls audio circuit 337. Under the control of audio circuit controller 339, for example, audio circuit 337 applies the received signals from demodulator 312 to control signal processor 338 or telephone unit 400 and selectively receives the signals from control signal processor 338 or telephone unit 400. Digital interface 340 interfaces the data communication between radio unit 300 and telephone unit 400. Power controller 341 controls power source 390 and sets a voltage supplied from battery 506 to power source 390 to a predetermined level. The voltage having the predetermined level is supplied to the respective circuit components.

An operation of the radio telecommunication apparatus having the above-described arrangement according to the first embodiment of the present invention will be described below.

Prior to speech communication processing in the apparatus of this embodiment, the apparatus may be switched from a standby state to an allowable call charge registration mode by a predetermined key operations, e.g., depressing keys of [FCN], [1], [1], continuously. After that, an allowable call charge may be registered into the apparatus by operating ten-keys. For example, keys of [1], [0], in the key section 430 are operated to enter $10 as the allowable call charge, and this input value is stored in the ID ROM 370 constituted by an $E^2PROM$.

The flow of operation shifts to an outgoing call operation in response to the input of a destination telephone number and the send key. Upon this outgoing call operation, over a control channel established between the apparatus and the base station, system data is received from the base station. Information representative of a charge rate is then extracted from this system data and is stored in the RAM 335.

The base station designates a speech channel for the mobile unit. In accordance with this designation, the mobile unit is tuned to the speech channel, and the base station is also tuned to the speech channel. Speech communication is then started through the designated speech channel.

In synchronism with an establishment of a speech communication link, the CPU 331 starts to count a speech communication time by using an internal clock pulse, and sequentially calculates call charges on the basis of the charge rate stored in the RAM 335 and the count values. The CPU 331 fetches the allowable call charge data from the ROM 370 and compares it with the calculation results. If it is determined that a call charge exceeds the allowable call charge, the CPU 331 sends a control signal for generating an alarm signal to the audio circuit 337. The audio circuit 337 sends the alarm signal to the loudspeaker 492 or the handset receiver 498 so as to cause the loudspeaker 492 or the handset receiver 498 to generate an alarm.

The user can confirm from this alarm that the current call charge exceeds the allowable call charge. Therefore, the speech communication time can be managed in accordance with this alarm.

Figure 3:
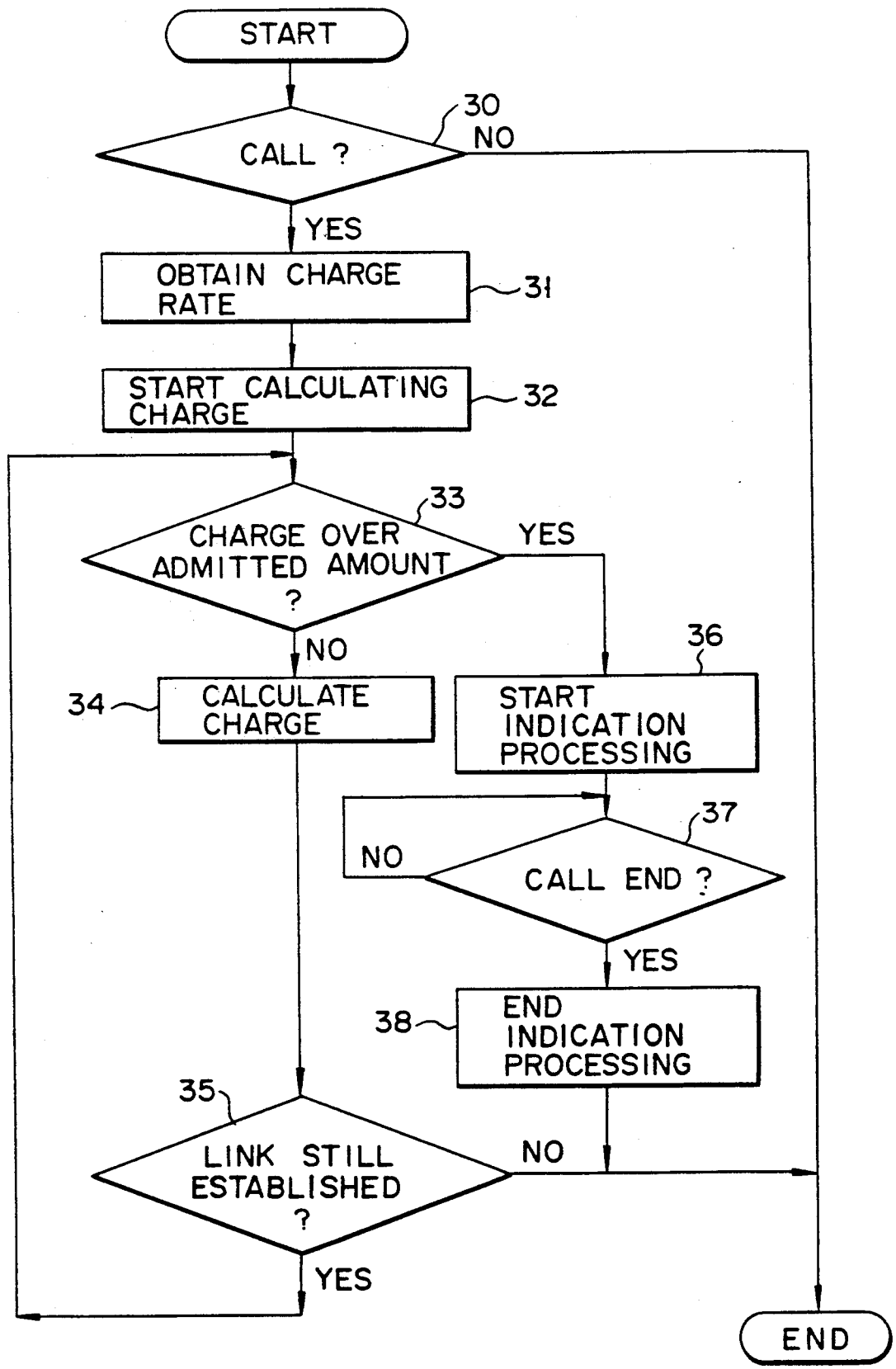
FIG. 3 is a flow chart showing an operation sequence of a radio telecommunication apparatus according to the first embodiment of the present invention.

The above-described operation will be described in more detail below with reference to the flow chart in FIG. 3.

When it is determined in step 3 that the operational state of the apparatus transits from a standby state to a speech communication state in which a speech communication link is established, the radio section 310 of the apparatus receives signals transmitted from the base station over the established speech communication link. The received signals are applied to the control signal processor 338 through the audio circuit 337. The control signal processor 338 detects a synchronization signal, an address data addressing the apparatus, and the following system data in the received signals. The detected system data are applied to CPU 331 via bus lines. The system data include information concerning a charge rate, which is extracted by CPU 331. CPU 331 stores the extracted charge rate information into the RAM 335 in step 31. The charge rate information, for example, consists of ten (10) bits. In step 32, the CPU 331 starts call charge count by starting to count a speech communication time, thus starting to calculate a call charge on the basis of the counted time and the charge rate obtained from the data received from the base station. More specifically, CPU 331 calculates a call charge by multiplying the counted time by the charge rate. In addition, the calculated call charge may be displayed on display unit 450 under the control of CPU 331. Thus, the user may be always informed of the call charge.

In step 33, the CPU 331 compares the calculated call charge with a preset allowable call charge which was stored in the allowable call charge registration mode so as to check whether the current call charge exceeds the allowable call charge. If NO in step 33, the flow advances to step 34, and the CPU 331 calculates the next call charge corresponding to an incremented count time. After it is determined in step 35 that the speech communication link is still established, the flow returns to step 33 in which the current call charge is compared with the allowable call charge.

If the CPU 331 determines that the current call charge exceeds the preset allowable call charge, it starts, for example, the following processing in step 36:

(1) generating an alarm from the loudspeaker 492 or the handset receiver 498 in the mobile unit by superposing it on speech;

(2) transmitting an alarm signal to the destination by superposing it on speech signals to be transmitted;

(3) displaying an alarm message on the display unit 450;

(4) causing a backlight for the display unit 450 to blink.

Note that these operations may be independently or simultaneously performed.

This indication processing may be continued until a speech communication link using the speech channel is broken down owing to user's on-hook operations and so on (steps 37 and 38). After that, the apparatus is set in a standby state again.

According to the radio telecommunication apparatus of this embodiment, therefore, long speech communication is determined on the basis of a call charge, and the user can be informed of this lengthy talk.

In the above-mentioned embodiment, while the charge rate is obtained through the speech communication link after it is established, the charge rate may be obtained in advance through a control channel before the speech communication link is established.

Figure 4:
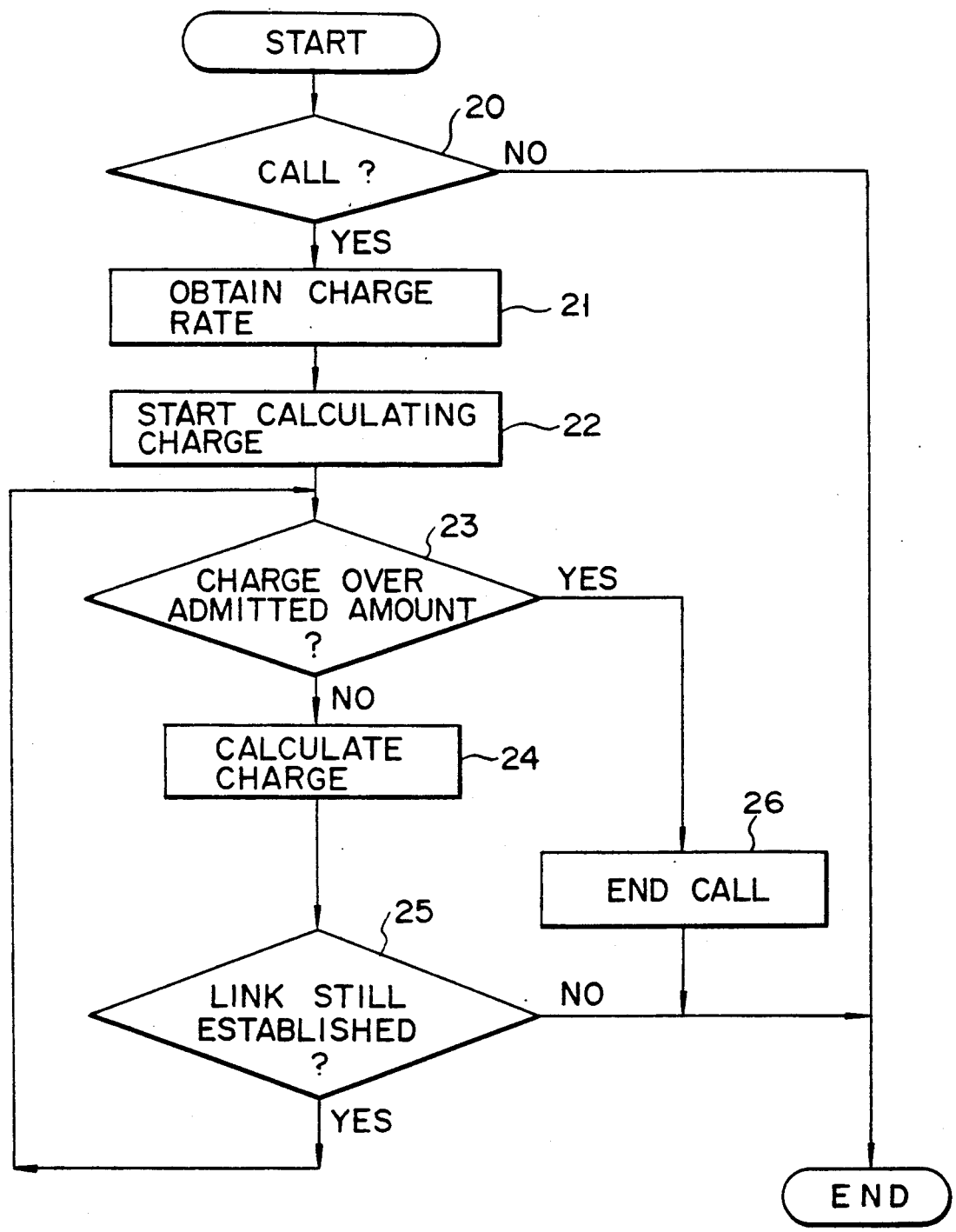
FIG. 4 is a flow chart showing an operation sequence of a radio telecommunication apparatus according to the second embodiment of the present invention.

The second embodiment of the present invention will be described below with reference to the flow chart in FIG. 4.

When it is determined in step 20 that the apparatus is set from a standby state to a speech communication state, the CPU 331 receives system data from the base station, reads a charge rate from the system data, and stores it in the RAM 335 in step 21. In step 22, the CPU 331 starts to count a speech communication time so as to start call charge count, and starts to calculate a call charge on the basis of the speech communication time and the charge rate.

In step 23, the CPU 331 compares the calculated call charge with a preset allowable call charge so as to check whether the current call charge exceeds the allowable call charge. If NO in step 23, the flow advances to step 24 to calculate the next call charge by using the call charge call count. When the CPU 331 determines that the speech communication link is still established, the flow returns to step 23 to compare the current call charge with the allowable call charge.

If the CPU 331 determines in step 23 that the current call charge exceeds the preset allowable call charge, it controls synthesizer 320 so as to supply demodulator 312 with signals having frequencies for scanning the control channel and modulator 314 to be turned off. Consequently, the established speech communication link is terminated in response to the excess of the call charge (step 26). After that, the operation returns to the standby state.

According to the radio telecommunication apparatus of this embodiment, long speech communication is determined on the basis of a call charge, and the speech communication can be forcibly ended. Therefore, a good economical effect can be expected.

The third embodiment of the present invention will be described below.

FIG. 5 is a flow chart showing an operation sequence of the apparatus of the third embodiment.

In this apparatus, indication processing is executed when an accumulated call charge for a plurality of calls exceeds a second preset allowable call charge. The second allowable call charge is stored in the ROM 370 by a key-operation in the same manner as in the above-described embodiments. The accumulated call charge up to the last call is also stored in the ROM 370.

When the apparatus is set from a standby state to a speech communication state, the CPU 331 checks in step 40 whether the accumulated call charge exceeds the second preset allowable call charge. If YES in step 40, predetermined processing indication and communication control operations of, e.g., inhibiting speech communication or generating an alarm, and informing the user of this state is performed in the similar manner as described in the above-mentioned embodiments (step 42).

If NO in step 40, the flow advances to step 41. After outgoing call processing, the CPU 331 receives system data from the base station, reads a charge rate from the system data, and stores it in the RAM 335 in step 43. In step 44, call charge count is started. A call charge based on this count result is added to the previous accumulated call charge stored in the ROM 370, and the updated accumulated call charge is stored in the RAM 335. In step 45, the CPU 331 compares the accumulated call charge with the second allowable call charge. If the accumulated call charge exceeds the second allowable call charge, the above-described indication and communication control operations is performed in step 42.

If the accumulated call charge does not exceed the second allowable call charge, call charge count is continued in step 46. If it is determined that the speech radio link is still established in step 47, the flow returns to step 45 to perform the same decision processing as described above.

After the speech communication link is broken down, the current accumulated call charge is written in the ROM 370.

Note that the above-described indication and communication control operations can be canceled by clearing the accumulated call charge stored in the ROM 370.

According to the radio telecommunication apparatus of this embodiment, whether the accumulated call charge exceeds the second allowable call charge can be informed to the user.

The accumulated call charge may be stored in a detachable memory device, e.g. an IC card, as disclosed U.S. patent application Ser. No. 07/526,401 filed on May 21, 1990, which is incorporated into the present application by reference.

Figure 6:
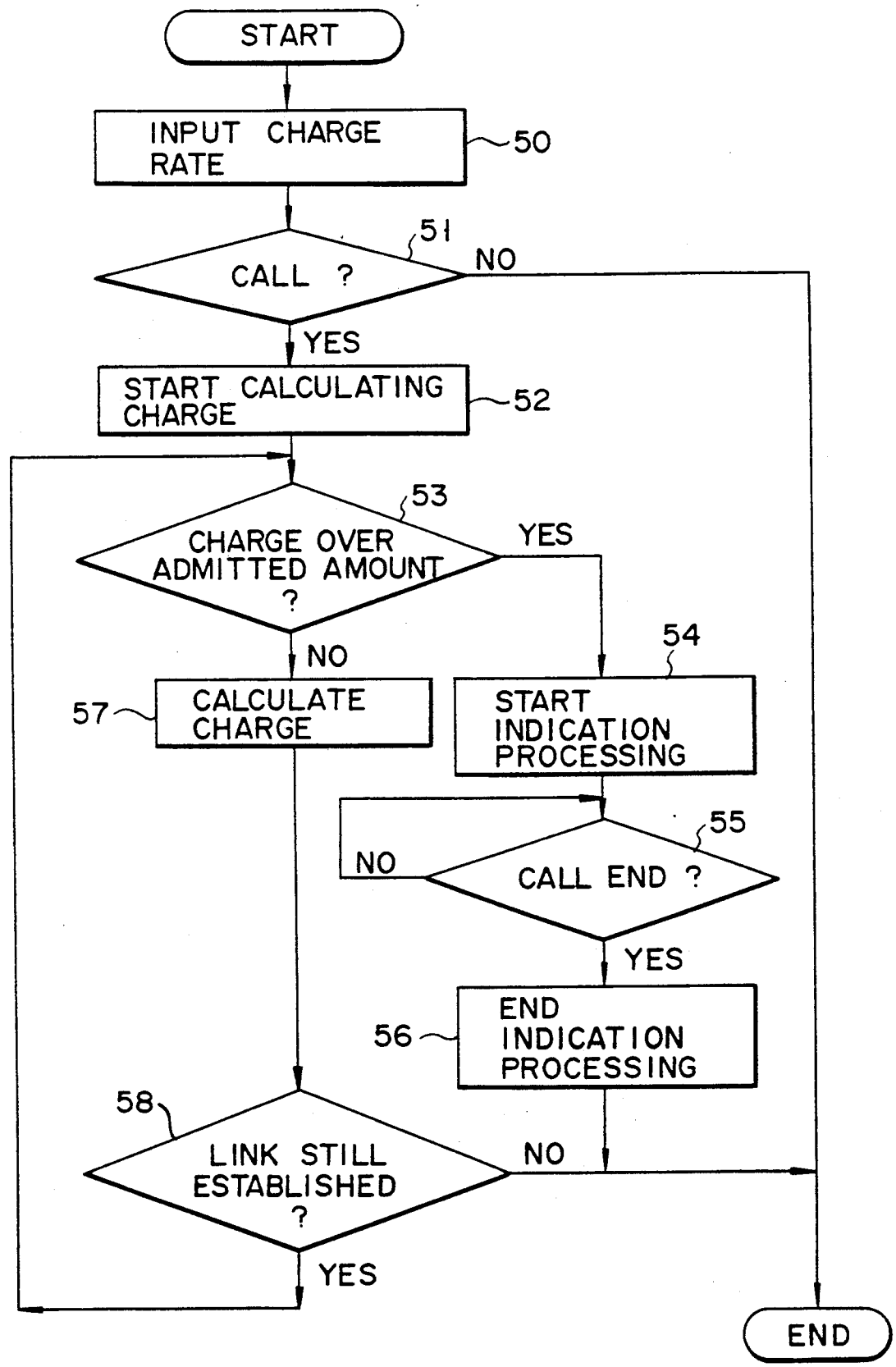
FIG. 6 is a flow chart showing an operation sequence of a radio telecommunication apparatus according to the fourth embodiment of the present invention.

The fourth embodiment of the present invention will be described below with reference to FIGS. 1, 2, and 6. In this embodiment, while the apparatus is in a standby state before speech communication, a unit time and a charge rate as call charge units are entered by the key unit 430 and are stored in the ROM 370 in step 50.

Upon operation of the key unit 430, an allowable call charge is entered as a call charge limit allowed for one call, and is stored in the RAM 335 while each input value is checked on the display unit 450.

When outgoing call processing is performed by entering a destination telephone number from the key unit 430 in step 51, the radio unit controller 330 performs outgoing call connection processing with respect to the base station through the mobile antenna 200. Upon completion of the connection processing, the apparatus is set in a speech communication state. In this speech communication state, an audible sound signal received through the mobile antenna 200 and the radio section 310 is sent to the loudspeaker 492 through the audio circuit 337. The audible sound signal input from the microphone 466 is sent to the radio section 310 through the audio circuit 337.

In this radio telecommunication apparatus, count of a speech communication time is started at the same time when a speech communication state is set, and calculation of a call charge is started by using the counted time and the preset charge rate in step 52. In step 53, the call charges are sequentially compared with the present allowable call charge with the lapse of a speech communication time. If it is determined in step 53 that the current call charge exceeds the allowable call charge, the flow advances to step 54 to inform this state to the user. Subsequently, on-hook processing is performed (step 55), and information processing is ended (step 56).

If the current call charge does not exceed the allowable call charge, the flow advances to step 57 to continue call charge count. When it is determined in step 58 that the line is still connected, the flow returns to step 53. This processing is repeated until the current call charge exceeds the allowable call charge.

The third embodiment may be combined with the first, second, or fourth embodiment. With such a combination, an accumulated call charge based on a plurality of calls can be simultaneously managed with a call charge based on one call.

Any combination of the following criteria may be used in combination to enable a number of different predetermined functions to be performed by the apparatus. The predetermined criteria may be based on an allotted charge for a single call at which point the user will be informed by an alarm, an allotted charge for a single call at which point the call is automatically terminated, an allotted charge for an unspecified number of calls at which point the user will be informed by an alarm, or an allotted time for an unspecified number of calls at which point the current call is automatically terminated.

Still, any other combinations of the abovementioned embodiments fall into the scope of the present invention. For example, the speech communication link may be terminated after the user is alarmed. In this event, a criterion for a disconnection of the speech communication link is a time longer than a criterion for an alarm.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A radio telecommunication apparatus, comprising:
    means for making a telecommunication link between the user of said apparatus and a second party to make a call for speech communication therebetween;
    means for obtaining a charge rate from system data from a base station coupled to said apparatus;
    means coupled to said obtaining means for storing the charge rate;
    means for setting a first allowable call charge for one call;
    means, coupled to said setting means, for storing the first allowable call charge;
    means, coupled to said making means, for counting the time used for speech communication time in the call and providing a count value corresponding thereto;
    means, coupled to said charge rate storing means and said counting means, for calculating a current call charge based on said charge rate and said count value;
    means, coupled to said calculating means and said first allowable call charge storing means, for comparing said current call charge with the first allowable call charge to determine whether the current call charge exceeds the first allowable call charge; and
    means, coupled to said comparing means, for informing both the user of the apparatus and the second party when the current call charge exceeds the first allowable call charge.

2. The apparatus of claim 1, wherein
    said setting means includes means for setting a second allowable call charge for a plurality of calls,
    said first allowable call charge storing means includes means for storing the second allowable call charge and means, coupled to said calculating means, for sequentially storing an accumulated call charge calculated by said calculating means for previously made calls,
    said comparing means is further coupled to the accumulated call charge storing means, and includes means for comparing said accumulated call charge with the second allowable call charge to determine whether the accumulated call charge exceeds the second allowable call charge, and
    said informing means informs both the user of the apparatus and the second party when the accumulated call charge exceeds the second allowable call charge.

3. A radio telecommunication apparatus, comprising:
    means for making a telecommunication link between the user of said apparatus and a second party to make a call for speech communication therebetween;
    means for setting a charge rate and a first allowable call charge for each call;
    means coupled to said setting means, for storing the charge rate;
    means coupled to said setting means for storing the first allowable call charge;
    means, coupled to said making means, for counting the time used for speech communication for the call and providing a count value corresponding thereto;
    means, coupled to said charge rate storing means and said counting means, for calculating a current call charge based on said charge rate and said count value;
    means, coupled to said calculating means and said first allowable call charge storing means, for comparing said current call charge with the first allowable call charge to determined whether the current call charge exceeds the first allowable call charge; and
    means, coupled to said comparing means, for informing both the user of the apparatus and the second party when the current call charge exceeds the first allowable call charge.

4. The apparatus of claim 3, wherein
    said setting means includes means for setting a second allowable call charge for a plurality of calls,
    said first allowable call charge storing means includes means for storing the second allowable call charge and means, coupled to said calculating means, for sequentially storing an accumulated call charge calculated by said calculating means for previously made calls,
    said comparing means is further coupled to the accumulated call charge storing means, and includes means for comparing said accumulated call charge with the second allowable call charge to determine whether said accumulated call charge exceeds said second allowable call charge, and
    said informing means informs both the user of the apparatus and the second party when said accumulated call charge exceeds said second allowable call charge.

5. A radio telecommunication apparatus, comprising:
    means for detecting a signal representing a charge rate transmitted over a radio channel;
    means coupled to said detecting means for storing said signal representing a charge rate;
    means for making a telecommunication link between the user of said apparatus and a second party over one or more radio channels;
    means coupled to said making means for measuring an elapsed time from the time of making the telecommunication link;
    means, coupled to said signal storing means and said time measuring means, for calculating a telecommunication charge based on said charge rate and said elapsed time; and
    means, coupled to said calculating means, for alarming both the user of the apparatus and the second party when said telecommunication charge exceeds a first predetermined criterion.

6. The apparatus of claim 5, further comprising means, coupled to said calculating means, for breaking said telecommunication link when the telecommunication charge exceeds a second predetermined criterion.

7. The apparatus of claim 6, further comprising means for setting the apparatus in a registration mode, and input means, coupled to said alarming means and said telecommunication link breaking means, for inputting the first and second predetermined criteria when the apparatus is in the registration mode, wherein the first and second criteria represent allowable call charges.

8. The apparatus of claim 5, wherein said making means includes means for making the telecommunication link in response to a call request from the user of the apparatus.

9. The apparatus of claim 5, wherein said calculating means includes means for multiplying the elapsed time with the charge rate.

10. The apparatus according to claim 5, further comprising means, coupled to said calculating means, for storing data representative of an accumulated telecommunication charge which is updated each time the telecommunication link is broken.

11. The apparatus of claim 10, wherein said data storing means includes a non-volatile memory.

12. The apparatus of claim 10, wherein said alarming means includes means for alarming both the user of the apparatus and the second party when said data exceeds a third predetermined criterion.

13. A radio telecommunication apparatus, comprising:
   means for detecting a signal representing a charge rate transmitted over a radio channel;
   means coupled to said detecting means for storing said signal representing a charge rate;
   means for making a telecommunication link between the user of said apparatus and a second party over one or more radio channels;
   means coupled to said making means for measuring an elapsed time from the time of making the telecommunication link;
   means coupled to said signal storing means and said time measuring means for calculating a telecommunication charge based on said charge rate and said elapsed time;
   means coupled to said calculating means for indicating the telecommunication charge to the user of the apparatus; and
   means coupled to said calculating means for alarming both the user of the apparatus and the second party when the telecommunication charge exceeds a first predetermined criterion.

14. The apparatus of claim 13, further comprising means, coupled to said calculating means, for breaking said telecommunication link when the telecommunication charge exceeds a second predetermined criterion.

* * * * *